(12) United States Patent
Lopez et al.

(10) Patent No.: US 10,017,061 B2
(45) Date of Patent: Jul. 10, 2018

(54) CHARGING SYSTEM WITH LUMINESCENT PORTION

(71) Applicant: FORD GLOBAL TECHNOLOGIES, LLC, Dearborn, MI (US)

(72) Inventors: Juan Lopez, Madison Heights, MI (US); Sriram Jala, Northville, MI (US); John Paul Gibeau, Canton, MI (US); Kevin Layden, Plymouth, MI (US); Susan Curry, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/005,076

(22) Filed: Jan. 25, 2016

(65) Prior Publication Data

US 2017/0210235 A1    Jul. 27, 2017

(51) Int. Cl.
*H02J 7/00* (2006.01)
*B60L 11/18* (2006.01)
*B60Q 1/26* (2006.01)

(52) U.S. Cl.
CPC ........ *B60L 11/1818* (2013.01); *B60Q 1/2661* (2013.01); *B60L 2230/12* (2013.01); *B60L 2250/16* (2013.01); *Y02T 10/7005* (2013.01); *Y02T 10/7088* (2013.01); *Y02T 90/121* (2013.01); *Y02T 90/14* (2013.01)

(58) Field of Classification Search
CPC .. B60L 11/1818; B60Q 1/2661; H01R 13/717
USPC .................... 320/109; 439/488–491
See application file for complete search history.

(56) References Cited

U.S. PATENT DOCUMENTS

| 7,540,641 | B2  |   | 6/2009  | Gardner et al. |
|-----------|-----|---|---------|----------------|
| 8,628,225 | B2  |   | 1/2014  | Hook et al.    |
| 2007/0080623 | A1 | * | 4/2007 | Iimura ................. F21K 2/04 |
|           |     |   |         | 313/483 |
| 2010/0159317 | A1 | * | 6/2010 | Taghikhani ............ B60L 1/003 |
|           |     |   |         | 429/120 |
| 2010/0246198 | A1 | * | 9/2010 | Hook ................. B60L 11/1818 |
|           |     |   |         | 362/459 |

FOREIGN PATENT DOCUMENTS

| CN | 104134491 |   | 11/2014 | |
| GB | 2495964 |   | 5/2013 | |
| JP | 06325834 A | * | 11/1994 | ......... B60L 11/1818 |
| JP | WO 2013027100 A1 | * | 2/2013 | ......... B60L 11/1818 |
| TW | 201318896 |   | 5/2013 | |
| WO | WO 2014195119 A2 | * | 12/2014 | ......... B60L 11/1818 |

OTHER PUBLICATIONS

Machine Translation of Kokufuya JP06325834A.*
Machine Translation of Nakayama et al. WO2013027100A1.*
Machine Translation of Kokufuya.*
Machine Translation of Nakayama.*
Honda Fit EV Concept—Honda pretty much pulls the wraps off the production Fit electric vehicle, Nov. 2010, retrieved from http://www.caranddriver.com/news/honda-fit-electric-vehicle-concept-debuts-honda-fit-ev-news.

* cited by examiner

*Primary Examiner* — David V Henze-Gongola
(74) *Attorney, Agent, or Firm* — Carlson, Gaskey & Olds, P.C.

(57) ABSTRACT

An exemplary electrified vehicle assembly includes a charging system having a luminescent portion. The charging system is configured to electrically couple together a charging station and an electrified vehicle.

16 Claims, 4 Drawing Sheets

CHARGING SYSTEM WITH LUMINESCENT PORTION

TECHNICAL FIELD

This disclosure relates generally to a charging system for an electrified vehicle. More particularly, this disclosure relates to a charging system that includes a luminescent portion.

BACKGROUND

Generally, electrified vehicles differ from conventional motor vehicles because electrified vehicles are selectively driven using one or more electric machines powered by batteries. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). A charging system can be used to connect an electrified vehicle to an external power source, such as a charging station. Power moves from the external power source, through the charging system, to one or more batteries of the electrified vehicle.

Some conventional vehicles and electrified vehicles include components, such as trunk release handles, molded from luminescent resins. Luminescent resins have been used in non-vehicle applications as well. For example, bezels made of luminescent resins have been used in connection with residential light switches and door knobs.

SUMMARY

An electrified vehicle assembly according to an exemplary aspect of the present disclosure includes, among other things, a charging system having a luminescent portion. The charging system is configured to electrically couple together a charging station and an electrified vehicle.

In a further non-limiting embodiment of the foregoing assembly, the luminescent portion is within a charging port of the electrified vehicle.

In a further non-limiting embodiment of any of the foregoing assemblies, the luminescent portion is within a charging plug of a charging station.

In a further non-limiting embodiment of any of the foregoing assemblies, the luminescent portion is within a terminal region of the charging plug.

In a further non-limiting embodiment of any of the foregoing assemblies, the terminal region comprises an outer surround and at least one terminal surround extending from a floor. The outer surround and the at least one terminal surround include a higher percentage of a luminescent resin than the floor.

In a further non-limiting embodiment of any of the foregoing assemblies, the luminescent portion is covered when the charging plug is electrically coupled to a charging port of the electrified vehicle, and at least a portion of the luminescent portion is uncovered when the charging plug is electrically decoupled from the charging port.

In a further non-limiting embodiment of any of the foregoing assemblies, a floor of the terminal region includes a first percentage of luminescent resin and a terminal surround of the terminal region includes a second, different percentage of luminescent resin.

In a further non-limiting embodiment of any of the foregoing assemblies, the first percentage of luminescent resin included in the floor is nominally zero.

In a further non-limiting embodiment of any of the foregoing assemblies, the luminescent portion comprises a molded luminescent resin.

In a further non-limiting embodiment of any of the foregoing assemblies, the assembly includes a bezel having a luminescent resin. The bezel surrounds at least a portion of a charging port of an electrified vehicle.

In a further non-limiting embodiment of any of the foregoing assemblies, a cable connects a charging plug of the charging system to another portion of the charging station. The cable includes a luminescent portion.

A method of coupling an electrified vehicle to an external charging station according to an exemplary aspect of the present disclosure includes, among other things, aligning a charging plug relative to a charging port using a luminescent portion of the charging port, the charging plug, or both. The method further includes moving the charging plug from an electrically decoupled position with the charging port to an electrically coupled position with the charging port.

In a further non-limiting embodiment of the foregoing method, the luminescent portion is within the charging port of the electrified vehicle.

In a further non-limiting embodiment of any of the foregoing methods, the luminescent portion is within the charging plug of a charging station.

In a further non-limiting embodiment of any of the foregoing methods, the luminescent portion is within a terminal region of the charging plug.

In a further non-limiting embodiment of any of the foregoing methods, a floor of the terminal region is less luminescent than a terminal surround of the terminal region.

In a further non-limiting embodiment of any of the foregoing methods, the luminescent portion includes a molded luminescent resin.

In a further non-limiting embodiment of any of the foregoing methods, the luminescent portion is hidden when the charging plug is in the electrically coupled position with the charging port, and the luminescent portion is visible when the charging plug is in the electrically decoupled position with the charging port.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a charging system incorporating a luminescent portion. The luminescent portion can assist a user when aligning electric vehicle supply equipment, especially in low light or no light environments. Example electric vehicle supply equipment includes a charging plug and a charging port, Example low light environments can include dimly lit parking structures, city streets at night, and dark residential garages.

Figure 1:
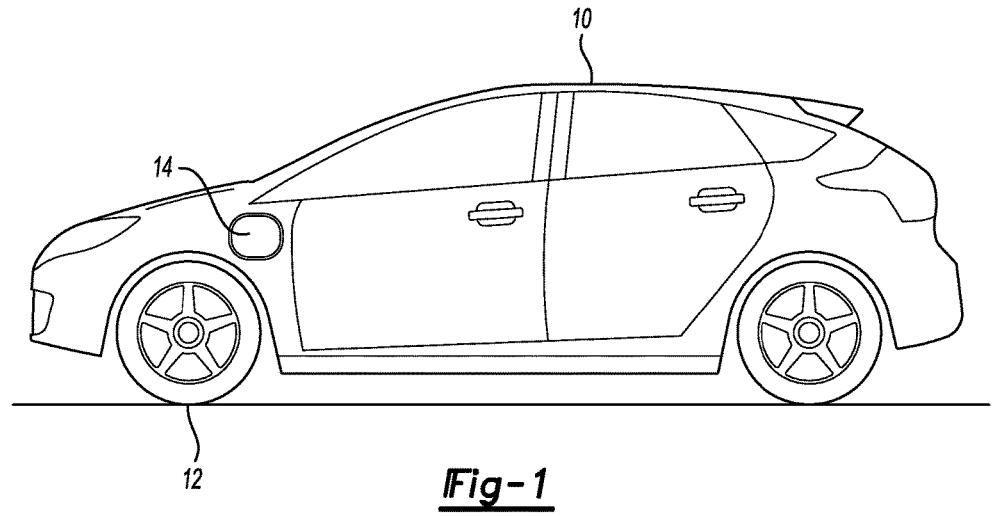
FIG. 1 illustrates a side view of an example electrified vehicle.
Figure 2:
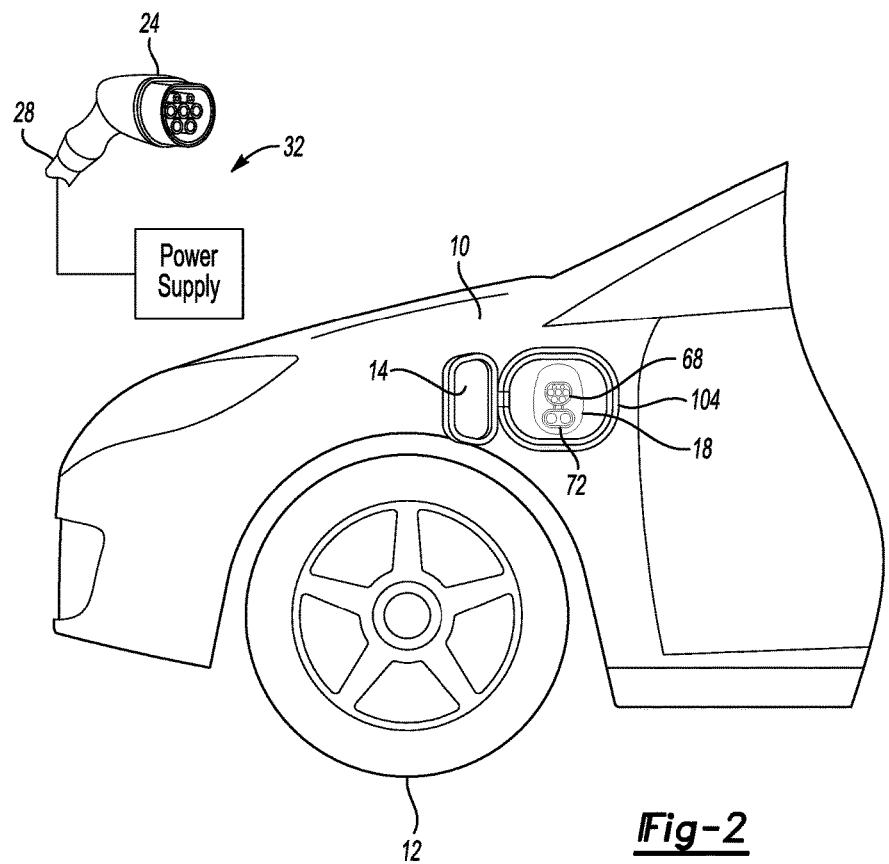
FIG. 2 illustrates a close-up view of a charging port of the electrified vehicle of FIG. 1.
Figure 3:
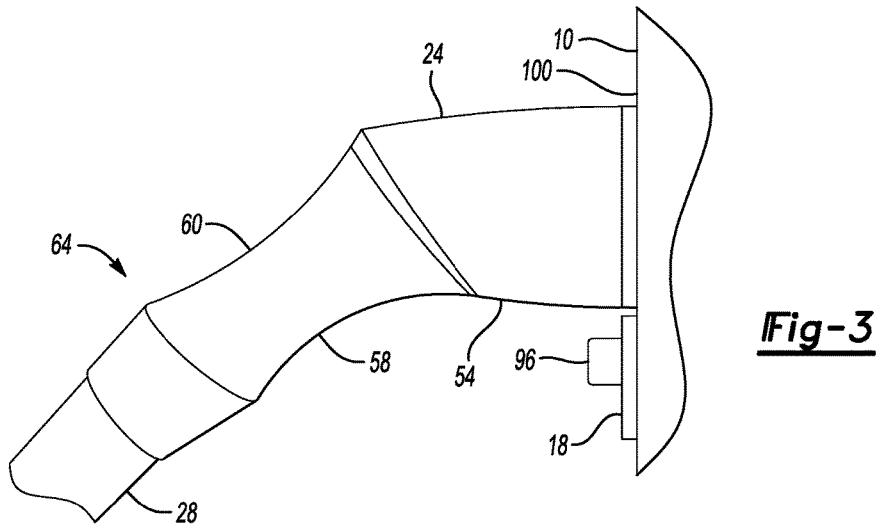
FIG. 3 illustrates a side view of the charging port of FIG. 2 electrically coupled to a charging plug.

Referring to FIGS. 1 to 3, an example vehicle 10 is a plug-in hybrid electric vehicle (PHEV) that includes a traction battery. In another example, the vehicle 10 is a battery electric vehicle (BEV).

A power-split powertrain of the vehicle 10 employs a first drive system and a second drive system. The first and second drive systems generate torque to drive one or more sets of vehicle drive wheels 12. The first drive system includes a combination of an internal combustion engine and a generator. The second drive system includes at least a motor, the generator, and the traction battery.

From time to time, charging the traction battery is required. When the vehicle 10 is moving, power from regenerative braking can charge the traction battery. When the vehicle 10 is stationary, an external power source 32 can charge the traction battery.

The vehicle 10 includes a charging port door 14 that, when closed, covers a charging port 18. The charging port 18 provides an interface on the vehicle 10 to electrically connect the vehicle 10 to the external power supply 22, such as an AC outlet at a vehicle operator's home or a public charging pole. Opening the door 14 reveals the charging port 18.

When charging the vehicle 10 using the external power supply 22, a user opens the door 14 and electrically couples a charging plug 24 to the charging port 18 so that power can transfer from the external power supply 22 to the traction battery within the vehicle 10.

The power recharges the traction battery. A charging cable 28 can connect the charging plug 24 to the external power supply 22.

The charging plug 24, the charging cable 28, and the external power supply 22 are types of electric vehicle supply equipment that together provide a charging station 32. The charging station 32 and the charging port 18 together provide a charging system for the vehicle 10.

The example charging system is shown as a charging system for use European markets. Other charging system configurations could be utilized for other markets, such as North America and China. Other charging systems include Mode 3 configurations.

The charging plug 24 is an electric vehicle supply equipment vehicle connector and is an AC charging plug in this example. In another example, the charging plug 24 is a DC charging plug.

Figure 4:
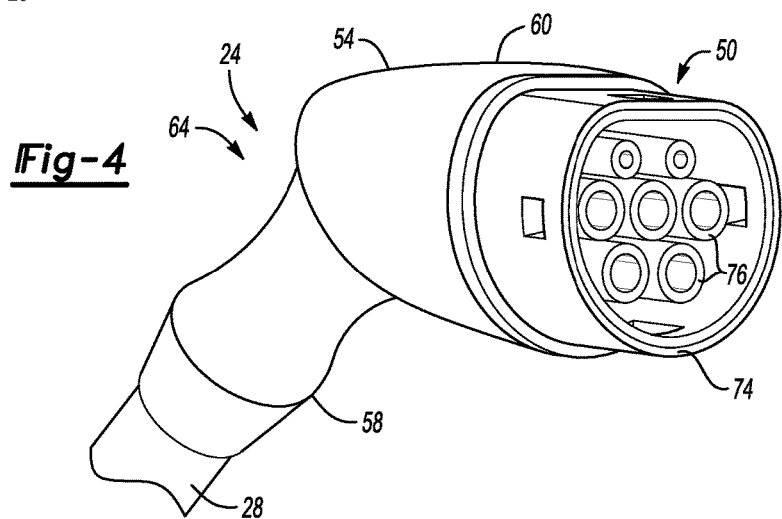
FIG. 4 illustrates a perspective view of the charging plug of FIG. 3.
Figure 5:
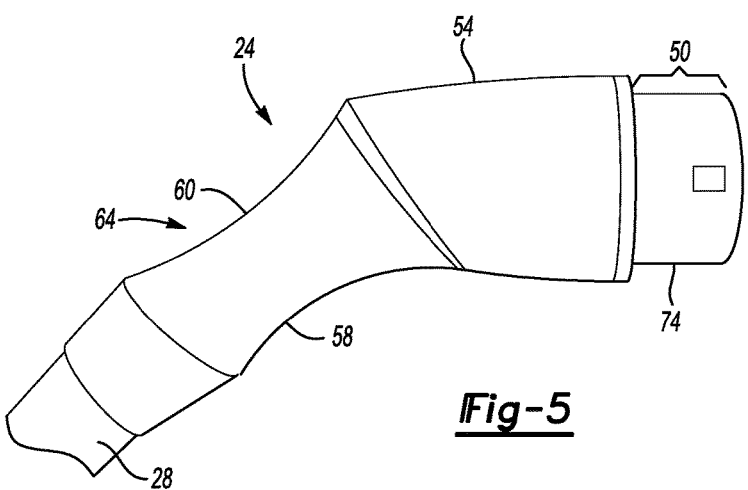
FIG. 5 illustrates a side view of the charging plug of FIG. 4.
Figure 6:
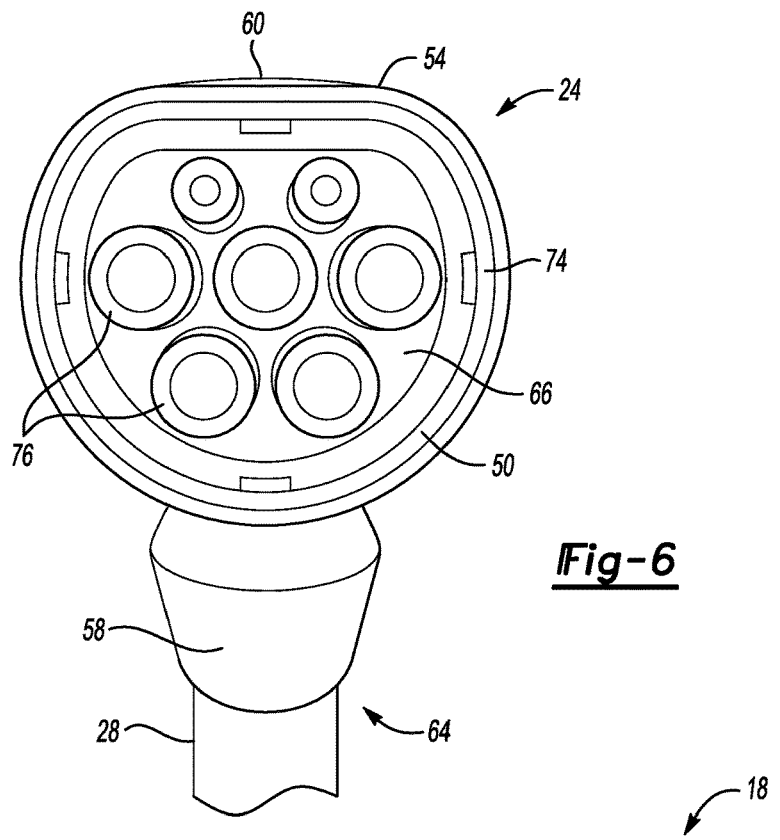
FIG. 6 illustrates a front view of the charging plug of FIG. 4.

Referring now to FIGS. 4 to 6 with continuing reference to FIGS. 2 and 3, the charging plug 24 includes a terminal region 50 and an outer housing 54. When the charging plug 24 is electrically coupled to the charging port 18, the terminal region 50 is received within the charging port 18 such that the terminal region 50 is hidden by the charging port 18.

In this example, at least a portion of the terminal region 50 is formed of a molded luminescent resin material. Luminescent resins include electrons that, when activated, can give off light. In some examples, luminescent resins will give off light, or glow, for up to 32 hours after the luminescent particles within the luminescent resin have been charged.

When not coupled to the charging port 18, the terminal region 50 of the charging plug 24 is highly visible in low light or no light environments. The visibility of the terminal region 50 can help the user locate the charging plug 24 in low light or no light environments. The visibility of the terminal region 50 can help the user align the charging plug 24 when moving the charging plug 24 into an electrically coupled relationship with the charging port 18 in low light or no light environments.

When the charging plug 24 is coupled to the charging port 18, the outer housing 54 is exposed and visible. The outer housing 54 does not include a molded luminescent resin material in this example. Because the terminal region 50 gives off light and the outer housing 54 does not, the terminal region 50 highly contrasts with the outer housing 54, especially in low light or no light environments.

In another example, selected portions of the outer housing 54 could incorporate a luminescent material. For example, a design characteristic or identifier of the outer housing 54 could incorporate a luminescent material. In yet another example, the outer housing 54 is molded with a luminescent resin such that substantially all of the charging plug 24 gives off light.

The outer housing 54 can be a two-piece clam shell design including portions that meet to surround and house areas of the charging plug 24. In this example, a first and second portion of the outer housing 54 meet at a lower interface 58 and an upper interface 60.

The outer housing 54 provides a handle area 64 that the user can grasp when aligning the charging plug 24 with the charging port 18. The handle area 64 can include a textured surface relative to other areas of the outer housing 54. The textured surface can assist the user gripping the handle area 64.

In some examples, the cable 28 could additionally incorporate a luminescent resin. An outermost insulation layer of the cable 28, for example, could house wires. The outermost insulation layer could include the luminescent resin. In such an example, the light given off by the cable 28 could prevent the user from tripping over the cable 28.

In this example, the terminal region 50 and the outer housing 54 are both made of a glass filled polymer material. The glass fill strengthens the charging plug 24, and helps the charging plug 24 meet thermal requirements, mechanical requirements, and other design requirements.

With particular reference to FIG. 5, a floor 66 of the terminal region 50 does not include a luminescent resin. In contrast to the floor 66, an outer surround 74 and individual terminal surrounds 76 do incorporate a luminescent resin. The outer surround 74 and individual terminal surrounds 76 thus contrast with the floor 66 of the terminal region 50, which can facilitate aligning terminals of the charging plug 24 with terminals of the charging port 18.

In another example, the floor 66 includes some luminescent resin. The percentage of luminescent resin in the floor can be varied relative to the percentage of luminescent resin in the outer surround 74 and the individual terminal surrounds 76. Varying the percentage of luminescent resin can cause the floor 66 to give off less light than the outer surround 74 and terminal surrounds 76, or more light than the outer surround 74 and terminal surrounds 76.

Figure 7:
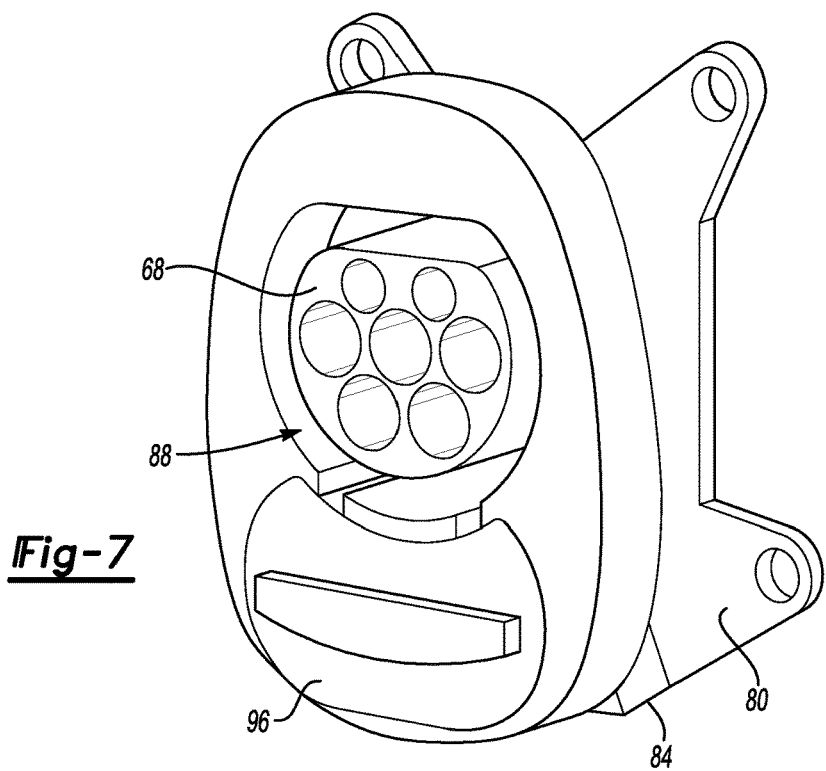
FIG. 7 illustrates a perspective view of the charging port of FIGS. 2 and 3 removed from the electrified vehicle.
Figure 8:
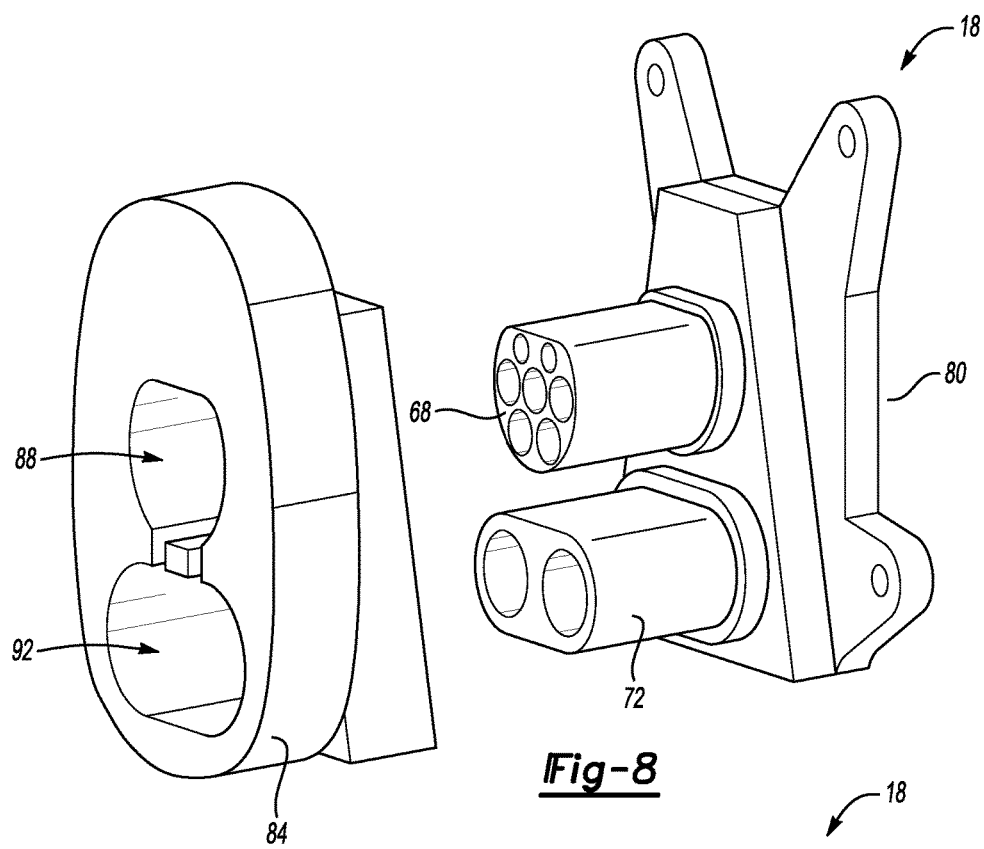
FIG. 8 illustrates an exploded view of the charging port of FIG. 7.
Figure 9:
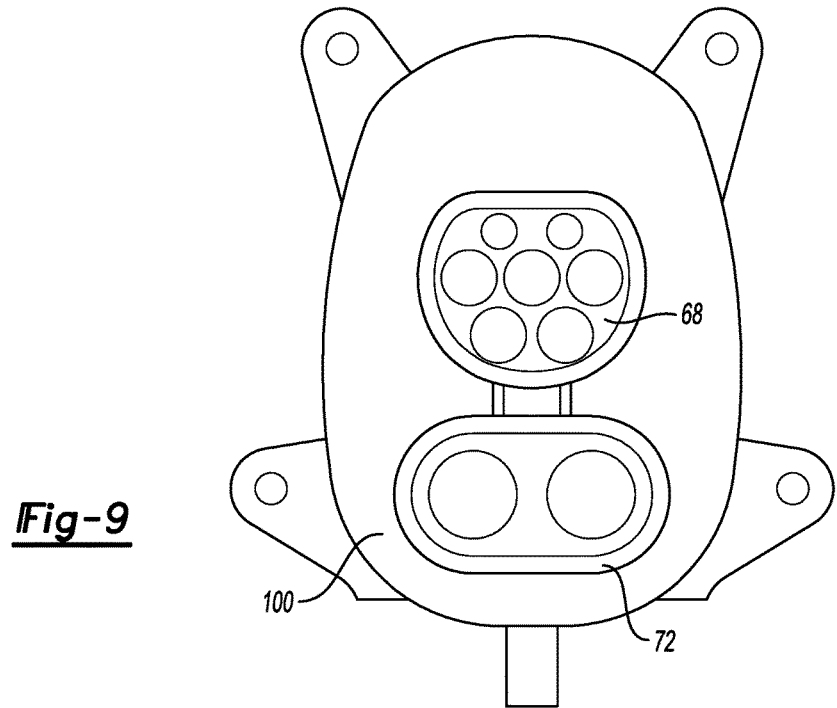
FIG. 9 illustrates a front view of the charging port of FIG. 7.

Referring now to FIGS. 7 to 9 with continuing reference to FIGS. 2 to 6, the charging port 18 is an assembly that includes an AC interface 68 and a DC interface 72. The charging plug 24 can electrically couple to the AC interface 68 during an AC charge of the traction battery. Another charging plug (not shown) can couple to the DC interface 72 if the traction battery is instead charged with a DC charge, such as a DC fast charge.

The charging port 18 can include selected areas incorporating a luminescent resin. In this example, the charging port 18 includes an interface portion 80 having the AC interface 68 and the DC interface 72. The charging port 18 further includes a cover 84 that provides apertures 88 and 92.

When assembled, the cover 84 fits over the interface portion 80 such that the AC interface 68 extends into the aperture 88, and the DC interface 72 extends into the aperture 92.

A secondary cover 96 can connect to the cover 84, the DC interface 72, or both to conceal the DC interface 72 during periods of nonuse. The secondary cover 96 is not shown in FIGS. 8 and 9 for drawing clarity.

In this example, the interface portion 80 of the charging port 18 is molded and incorporates a luminescent resin. The interface portion 80 is molded of a glass filled polymer material. The glass fill strengthens the interface portion 80 so that the interface portion 80 can meet design requirements.

The cover 84, in contrast to the interface portion 80, is molded without a luminescent resin. Thus, the AC interface 68 and the DC interface 72 give off light and contrast with an outwardly facing surface 100 of the cover 84 when the charging port 18 is positioned within the vehicle 10. This high contrast between the interfaces 68 and 72, and the surface 100 helps the user locate the AC interface 68 and the DC interface 72 in a low light or no light environment.

In FIG. 3, the charging plug 24 is shown in an electrically coupled with the charging port 18. In the electrically coupled, the terminal region 50 of the charging plug 24 is not visible, thus, the luminescent portions of the terminal region 50 are not visible. Concealing luminescent portions when the charging plug 24 is engaged with the charging port 18 may be desirable if the luminescent portions are objectionable from an aesthetic perspective.

The charging system for the vehicle 10 could include other areas incorporating a luminescent resin. For example, a bezel 104 (FIGS. 1 and 2) of the vehicle 10 could incorporate a luminescent resin. The bezel 104 could surround some or all of the charging port 18, the door 14, or both. The bezel 104 could give off light that is visible when the door 14 is closed. In another example, the luminescent bezel 104 could be visible when the door 14 is open, but not when the door 14 is closed.

Features of the disclosed examples include a charging system incorporating a luminescent portion that can help locate and align without requiring, for example, LEDs. The luminescent portion gives off light and avoids the complexity and cost associated with LEDs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
a charging system having a luminescent portion provided by a molded luminescent resin within a charging plug, the charging system configured to electrically couple together a charging station and an electrified vehicle, the luminescent portion covered when the charging plug is electrically coupled to a charging port of the electrified vehicle, at least some of the luminescent portion uncovered when the charging plug is electrically decoupled from the charging port.

2. The assembly of claim 1, wherein the charging port of the electrified vehicle additionally includes a luminescent portion.

3. The assembly of claim 1, wherein the luminescent portion is within a terminal region of the charging plug.

4. The assembly of claim 3, wherein the terminal region comprises an outer surround and at least one terminal surround extending from a floor, the outer surround and the at least one terminal surround including a higher percentage of the molded luminescent resin than the floor.

5. The assembly of claim 1, wherein a floor of the terminal region includes a first percentage of the molded luminescent resin and a terminal surround of the terminal region includes a second, different percentage of the molded luminescent resin.

6. The assembly of claim 5, wherein the first percentage of the molded luminescent resin included in the floor is nominally zero.

7. The assembly of claim 1, further comprising a bezel having a molded luminescent resin, the bezel surrounding at least a portion of the charging port of the electrified vehicle.

8. The assembly of claim 1, further comprising a cable connecting the charging plug of the charging system to another portion of the charging station, wherein the cable additionally includes a luminescent portion.

9. The assembly of claim 5, wherein the first percentage of the molded luminescent resin included in the floor includes some molded luminescent resin.

10. The assembly of claim 3, wherein the terminal region includes an outer surround about a plurality of individual terminal surrounds that extend from a floor, the outer surround and the individual terminal surrounds each including some of the molded luminescent resin, the floor lacking the molded luminescent resin.

11. The assembly of claim 1, wherein the molded luminescent resin is a polymer material.

12. A method of coupling an electrified vehicle to an external charging station, comprising:
aligning a charging plug relative to a charging port using a luminescent portion of the charging port, the charging plug, or both; and
moving the charging plug from an electrically decoupled position with the charging port to an electrically coupled position with the charging port, wherein the luminescent portion is a molded luminescent resin within the charging plug of a charging station, wherein a floor of the terminal region includes some of the molded luminescent resin, such that the floor is luminescent, and the floor is less luminescent than a terminal surround of the terminal region.

13. The method of claim 12, wherein the charging port of the electrified vehicle additionally includes a luminescent portion.

14. The method of claim 12, wherein the luminescent portion is within a terminal region of the charging plug.

15. The method of claim 12, wherein the molded luminescent resin is a polymer material.

16. A method of coupling an electrified vehicle to an external charging station, comprising:
- aligning a charging plug relative to a charging port using a luminescent portion of the charging port, the charging plug, or both; and
- moving the charging plug from an electrically decoupled position with the charging port to an electrically coupled position with the charging port, wherein the luminescent portion is a molded luminescent resin,
- wherein the luminescent portion is hidden when the charging plug is in the electrically coupled position with the charging port, and the luminescent portion is visible when the charging plug is in the electrically decoupled position with the charging port.

\* \* \* \* \*

UNITED STATES PATENT AND TRADEMARK OFFICE
CERTIFICATE OF CORRECTION

PATENT NO. : 10,017,061 B2  
APPLICATION NO. : 15/005076  
DATED : July 10, 2018  
INVENTOR(S) : Juan Lopez et al.

Page 1 of 1

It is certified that error appears in the above-identified patent and that said Letters Patent is hereby corrected as shown below:

In the Claims

In Claim 5, Column 6, Line 21: before "wherein a floor" replace "claim 1," with --claim 3,--

Signed and Sealed this  
Fourth Day of September, 2018

Andrei Iancu  
*Director of the United States Patent and Trademark Office*